(12) United States Patent
Makarov

(10) Patent No.: US 9,439,547 B2
(45) Date of Patent: Sep. 13, 2016

(54) CYCLONIC SEPARATOR ASSEMBLY FOR A VACUUM CLEANER

(71) Applicant: Techtronic Floor Care Technology Limited, Tortola (VG)

(72) Inventor: Sergey V. Makarov, Solon, OH (US)

(73) Assignee: Techtronic Floor Care Technology Limited, Tortola (VG)

( * ) Notice: Subject to any disclaimer, the term of this patent is extended or adjusted under 35 U.S.C. 154(b) by 103 days.

(21) Appl. No.: 14/176,266

(22) Filed: Feb. 10, 2014

(65) Prior Publication Data

US 2014/0223871 A1    Aug. 14, 2014

Related U.S. Application Data

(62) Division of application No. 13/764,311, filed on Feb. 11, 2013, now Pat. No. 8,679,211.

(51) Int. Cl.
*B01D 45/00* (2006.01)
*A47L 9/16* (2006.01)
(Continued)

(52) U.S. Cl.
CPC .............. *A47L 9/1608* (2013.01); *A47L 9/165* (2013.01); *A47L 9/1641* (2013.01); *A47L 9/1666* (2013.01); *B04C 5/26* (2013.01); *B04C 5/28* (2013.01)

(58) Field of Classification Search
CPC ... A47L 9/1608; A47L 9/165; A47L 9/1666; A47L 9/1641; A47L 9/1683; A47L 9/009; A47L 5/225
USPC ............ 55/343, 346, 459.1, DIG. 3; 15/347, 15/346, 352, 353
See application file for complete search history.

(56) References Cited

U.S. PATENT DOCUMENTS 1,940,196 A * 12/1933 Wagner .......................... 55/343
4,437,984 A    3/1984 King et al.
(Continued)

FOREIGN PATENT DOCUMENTS

CN    101416849    4/2009
CN    101626716    1/2010
(Continued)

OTHER PUBLICATIONS

Extended European Search Report for Application No. 14154443.7 dated Apr. 8, 2014 (6 pages).
(Continued)

*Primary Examiner* — Dung H Bui
(74) *Attorney, Agent, or Firm* — Michael Best & Friedrich LLP

(57) ABSTRACT

A cyclonic separator assembly for use with a vacuum cleaner includes a body having an inlet, an outlet, and an inner surface. The cyclonic separator assembly also includes a cyclone unit positioned within the body between the inlet and the outlet. The cyclone unit has an outer perimeter that is spaced apart from the inner surface of the body to define an inlet space therebetween. The cyclone unit includes a plurality of first cyclones in communication with the inlet space and arranged along an outer circle adjacent the outer perimeter. The cyclone unit also includes a plurality of second cyclones in communication with the inlet space and arranged along an inner circle that is spaced apart from the outer circle such that each second cyclone is nested between two adjacent first cyclones. The plurality of first cyclones and the plurality of second cyclones are arranged in parallel.

7 Claims, 5 Drawing Sheets

(51) Int. Cl.
*B04C 5/26* (2006.01)
*B04C 5/28* (2006.01)

(56) References Cited

U.S. PATENT DOCUMENTS

| | | | |
|---|---|---|---|
| 6,468,330 B1 | 10/2002 | Irving et al. | |
| 6,887,290 B2 | 5/2005 | Strauser et al. | |
| 7,744,667 B2* | 6/2010 | Oh | A47L 9/1625 55/343 |
| 7,867,308 B2* | 1/2011 | Conrad | A47L 9/1608 15/352 |
| 7,887,612 B2 | 2/2011 | Conrad | |
| 7,931,717 B2 | 4/2011 | Conrad | |
| 7,955,405 B2 | 6/2011 | Smith | |
| 7,955,406 B2 | 6/2011 | Smith | |
| 7,976,597 B2 | 7/2011 | Smith | |
| 8,152,878 B2 | 4/2012 | McLeod | |
| 8,679,211 B1 | 3/2014 | Makarov | |
| 8,747,679 B2* | 6/2014 | Sarshar | B01D 17/0217 209/12.1 |
| 2006/0230724 A1* | 10/2006 | Han | A47L 9/1625 55/345 |
| 2008/0172994 A1* | 7/2008 | Courtney | A47L 9/1625 55/345 |
| 2008/0172995 A1* | 7/2008 | Conrad | 55/345 |
| 2008/0184681 A1 | 8/2008 | Oh et al. | |
| 2008/0289140 A1* | 11/2008 | Courtney | A47L 9/1625 15/353 |
| 2009/0031524 A1* | 2/2009 | Courtney | A47L 9/1625 15/347 |
| 2009/0100810 A1* | 4/2009 | Smith | 55/343 |
| 2009/0209403 A1 | 8/2009 | Conrad | |
| 2010/0025305 A1 | 2/2010 | Mehlberg | |
| 2010/0218338 A1 | 9/2010 | McLeod | |
| 2012/0272474 A1* | 11/2012 | Follows | A47L 9/1641 15/347 |
| 2013/0160232 A1 | 6/2013 | Peace | |
| 2013/0160233 A1* | 6/2013 | Peace | A47L 9/1625 15/353 |
| 2013/0291334 A1* | 11/2013 | Peng | 15/353 |

FOREIGN PATENT DOCUMENTS

| | | |
|---|---|---|
| GB | 2500934 | 10/2013 |
| WO | 2008/070965 | 6/2008 |

OTHER PUBLICATIONS

T6 Max Cyclonic Cup, publicly available before Feb. 11, 2013 (2 pages).
Chinese Office Action for Application 2014100486255 dated Nov. 4, 2015 (30 pages).

* cited by examiner

CYCLONIC SEPARATOR ASSEMBLY FOR A VACUUM CLEANER

CROSS-REFERENCE TO RELATED APPLICATIONS

This application is a divisional of U.S. patent application Ser. No. 13/764,311, filed Feb. 11, 2013, the entire contents of which are incorporated by reference herein.

FIELD OF THE INVENTION

The present invention relates to vacuum cleaners and, more particularly, to cyclonic separator assemblies for vacuum cleaners.

SUMMARY

In one embodiment, the invention provides a cyclonic separator assembly for use with a vacuum cleaner. The cyclonic separator assembly includes a body having an inlet, an outlet, and an inner surface. The cyclonic separator assembly also includes a cyclone unit positioned within the body between the inlet and the outlet. The cyclone unit has an outer perimeter that is spaced apart from the inner surface of the body to define an inlet space therebetween. The cyclone unit includes a plurality of first cyclones in communication with the inlet space. The plurality of first cyclones is arranged along an outer circle adjacent the outer perimeter. The cyclone unit also includes a plurality of second cyclones in communication with the inlet space. The plurality of second cyclones is arranged along an inner circle that is spaced apart from the outer circle such that each second cyclone is nested between two adjacent first cyclones. The plurality of first cyclones and the plurality of second cyclones are arranged in parallel.

In another embodiment, the invention provides a cyclonic separator assembly for use with a vacuum cleaner. The cyclonic separator assembly includes a body having an inlet and an outlet. The cyclonic separator assembly also includes a cyclone unit positioned within the body between the inlet and the outlet. The cyclone unit has an outer perimeter. The cyclone unit includes a plurality of first cyclones arranged along an outer circle adjacent the outer perimeter, and a plurality of second cyclones arranged along an inner circle that is spaced apart from the outer circle. The plurality of first cyclones and the plurality of second cyclones are arranged in parallel. The number of cyclones in the plurality of first cyclones is substantially equal to the number of cyclones in the plurality of second cyclones.

In yet another embodiment, the invention provides a cyclonic separator assembly for use with a vacuum cleaner. The cyclonic separator assembly includes a body having an inlet, an outlet, and an inner surface. The cyclonic separator also includes a cyclone unit positioned within the body between the inlet and the outlet. The cyclone unit has an outer perimeter that is spaced apart from the inner surface of the body to define an inlet space therebetween. The cyclone unit includes a plurality of first cyclones arranged along an outer circle adjacent the outer perimeter, and a plurality of first inlet paths extending from the inlet space to the plurality of first cyclones. Each first inlet path has a first length. The cyclone unit also includes a plurality of second cyclones arranged along an inner circle that is spaced apart from the outer circle, and a plurality of second inlet paths extending from the inlet space to the plurality of second cyclones. Each second inlet path has a second length. A ratio of the second length to the first length is less than 2.

In still another embodiment, the invention provides a cyclonic separator assembly for use with a vacuum cleaner. The cyclonic separator assembly includes a body having an inlet, an outlet, and a central longitudinal axis. The cyclonic separator assembly also includes a cyclone unit positioned within the body between the inlet and the outlet. The cyclone unit has an outer perimeter that defines a total cross-sectional area of the cyclone unit measured perpendicular to the central longitudinal axis. The cyclone unit includes a plurality of first cyclones arranged along an outer circle adjacent the outer perimeter. Each first cyclone has an air outlet, a particle outlet, a first longitudinal axis extending between the air outlet and the particle outlet, and a first cross-sectional area measured perpendicular to the first longitudinal axis. The cyclone unit also includes a plurality of second cyclones arranged along an inner circle that is spaced apart from the outer circle. Each second cyclone has an air outlet, a particle outlet, a second longitudinal axis extending between the air outlet and the particle outlet, and a second cross-sectional area measured perpendicular to the second longitudinal axis. The plurality of first cyclones and the plurality of second cyclones are arranged in parallel. A ratio of the sum of the first and second cross-sectional areas to the total cross-sectional area is between about 0.4 and about 0.6.

In yet still another embodiment, the invention provides a cyclonic separator assembly for use with a vacuum cleaner. The cyclonic separator assembly includes a body having an inlet, an outlet, and an inner surface. The cyclonic separator assembly also includes a cyclone unit positioned within the body between the inlet and the outlet. The cyclone unit has an outer perimeter that is spaced apart from the inner surface of the body to define an inlet space therebetween. The cyclone unit includes a plurality of first cyclones arranged along an outer circle adjacent the outer perimeter, and a plurality of first inlet paths extending from the inlet space to the plurality of first cyclones. Each first inlet path has an end at the outer perimeter of the cyclone unit. The ends of the plurality of first inlet paths are circumferentially spaced evenly about the outer perimeter. The cyclone unit also includes a plurality of second cyclones arranged along an inner circle that is spaced apart from the outer circle, and a plurality of second inlet paths extending from the inlet space to the plurality of second cyclones. Each second inlet path has an end at the outer perimeter of the cyclone unit. The ends of the plurality of second inlet paths are circumferentially spaced evenly about the outer perimeter.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
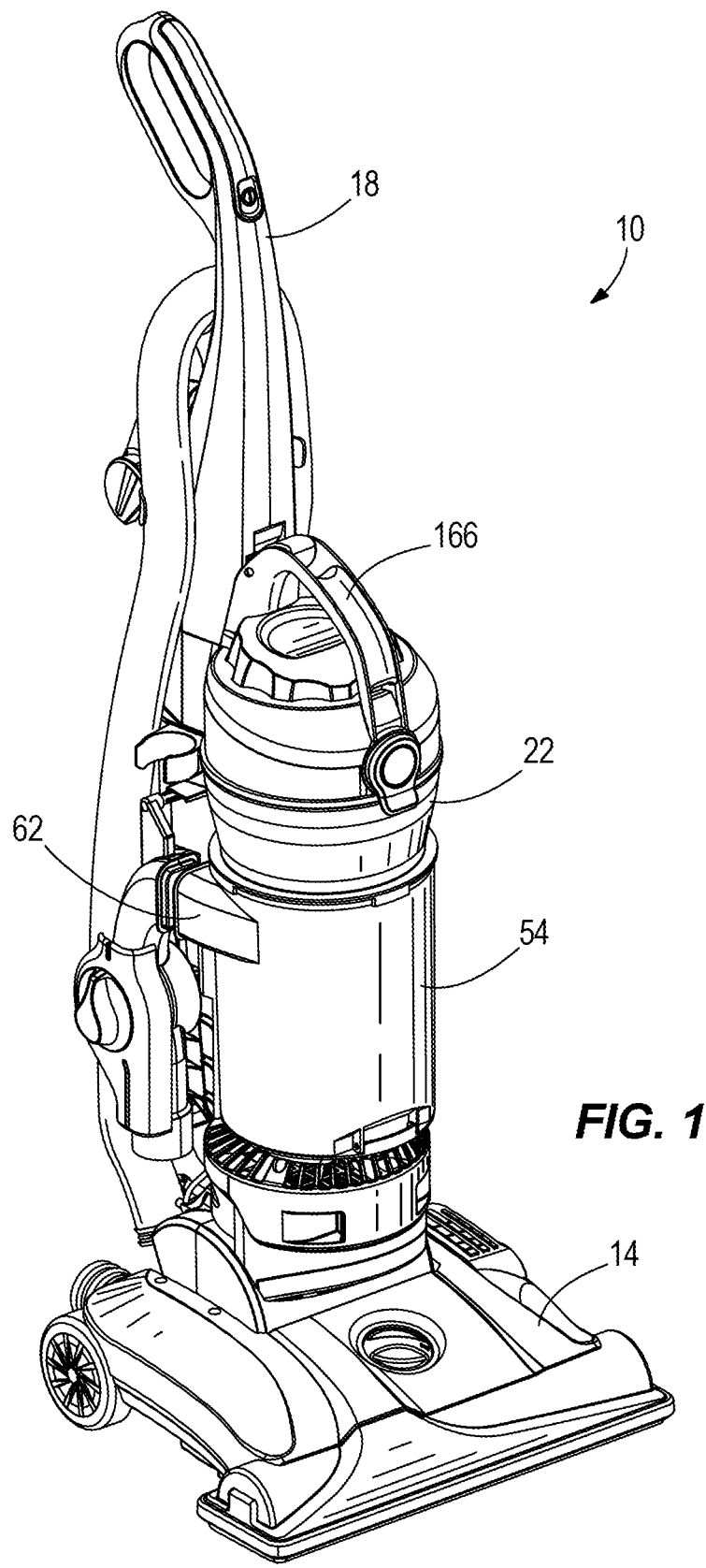
FIG. 1 is a perspective view of a vacuum cleaner.

FIG. 1 illustrates a vacuum cleaner 10 for vacuuming a surface. In the illustrated embodiment, the vacuum cleaner 10 is an upright-style vacuum cleaner that includes a foot 14 and a handle 18 pivotally coupled to the foot 14. In other embodiments, the vacuum cleaner 10 may be a canister-style vacuum. The illustrated vacuum cleaner 10 includes a cyclonic separator assembly 22 to separate dirt, dust, and other debris from an airflow drawn in through a nozzle in the foot 14 or an accessory tool. The cyclonic separator assembly 22 is removably mounted on the foot 14 and the handle 18 to facilitate emptying assembly 22 when full.

Figure 2:
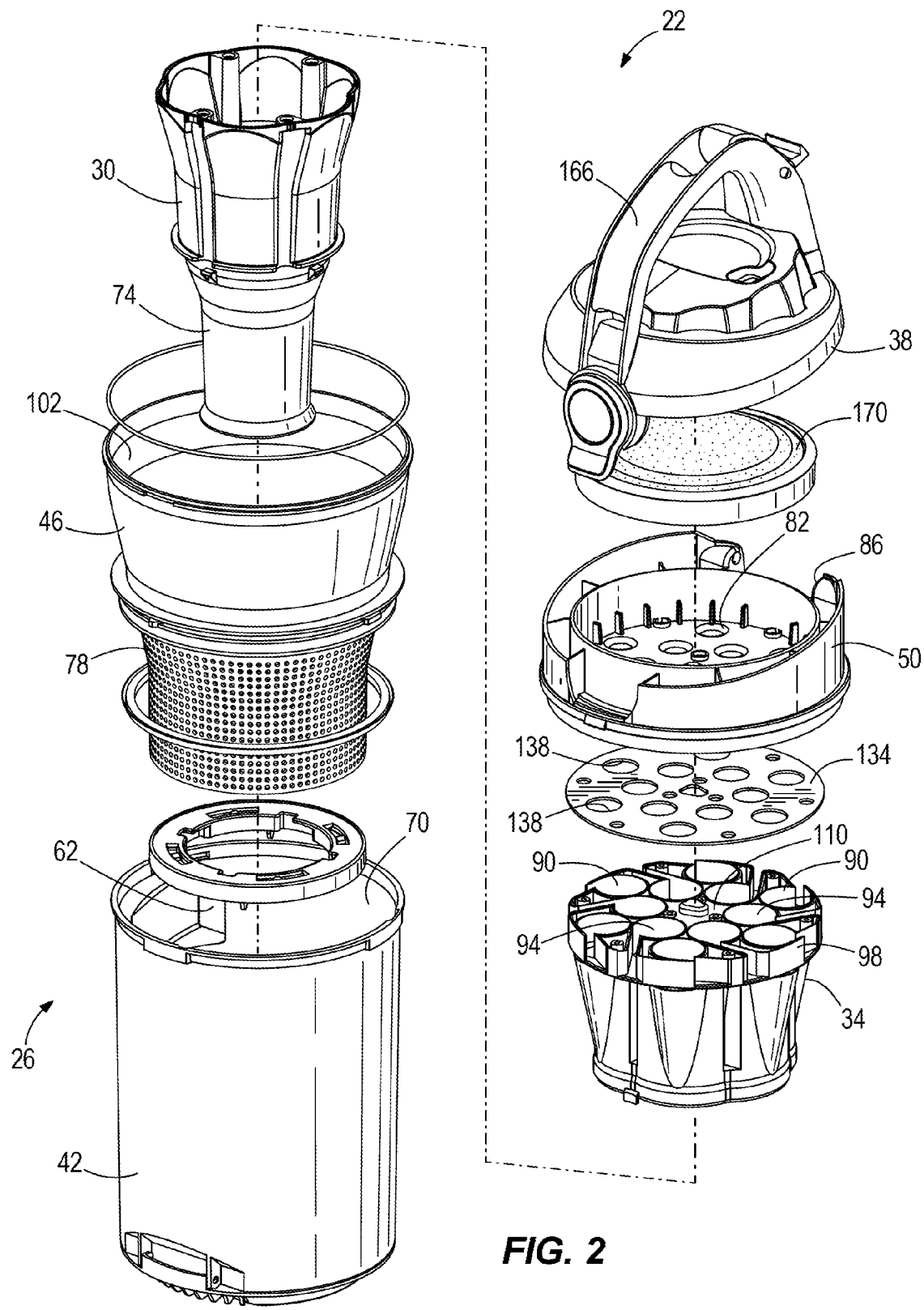
FIG. 2 is an exploded perspective view of a cyclonic separator assembly of the vacuum cleaner.

As shown in FIG. 2, the cyclonic separator assembly 22 includes a body 26, an inner dirt cup 30, a cyclone unit 34, and a cover 38. The body 26 defines a primary cyclone stage of the cyclonic separator assembly 22. The cyclone unit 34 defines a secondary cyclone stage of the cyclonic separator assembly 22. The primary and secondary cyclone stages are arranged in series such that an airflow entering the assembly 22 first travels through the primary cyclone stage and then travels through the secondary cyclone stage. The primary cyclone stage separates relatively large particles from the airflow, while the secondary cyclone stage separates relatively small particles from the airflow before the airflow is discharged back into the environment.

Figure 4:
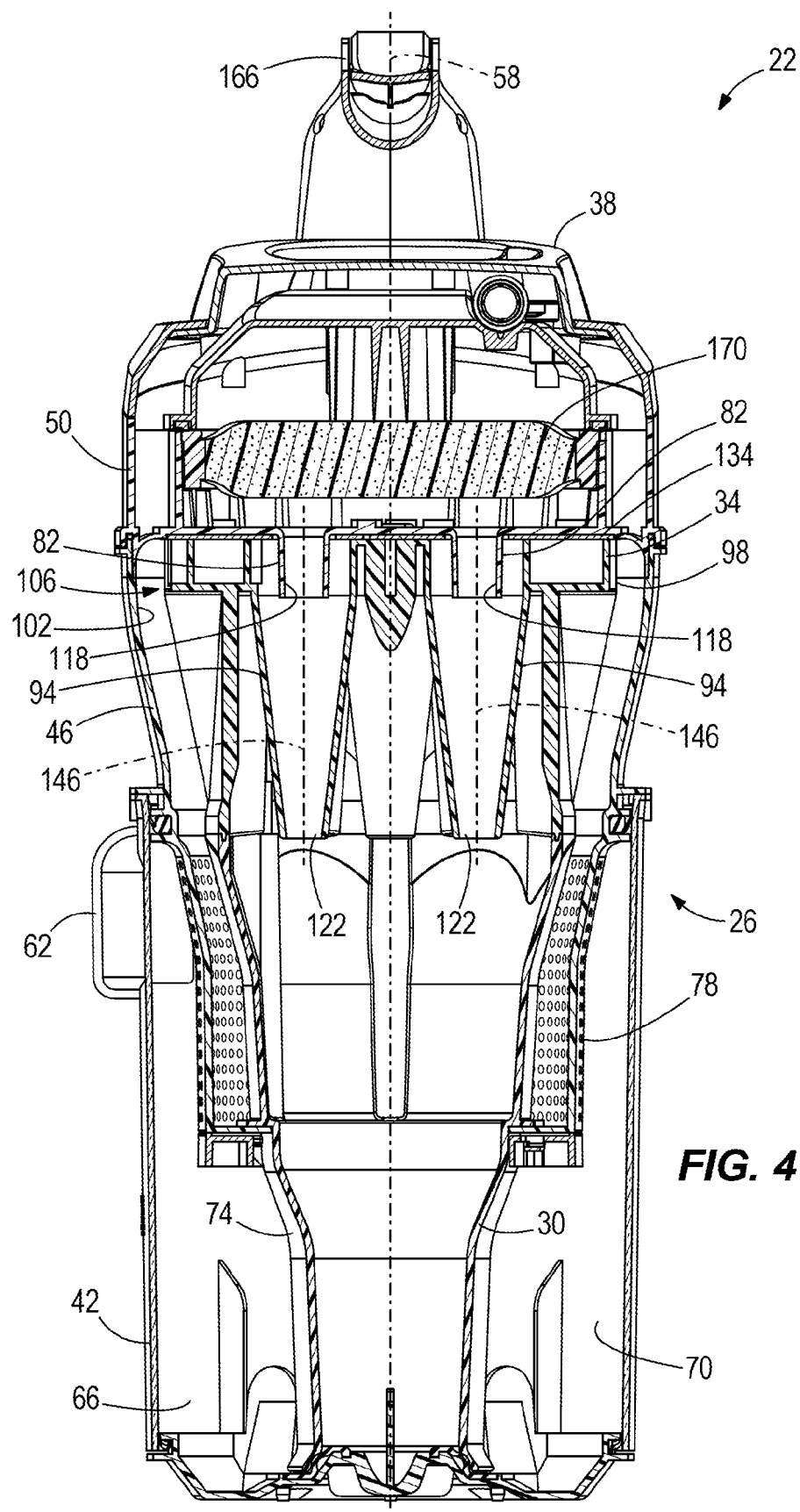
FIG. 4 is a cross-sectional view of the cyclonic separator assembly taken along section line 4-4 of FIG. 3.
Figure 5:
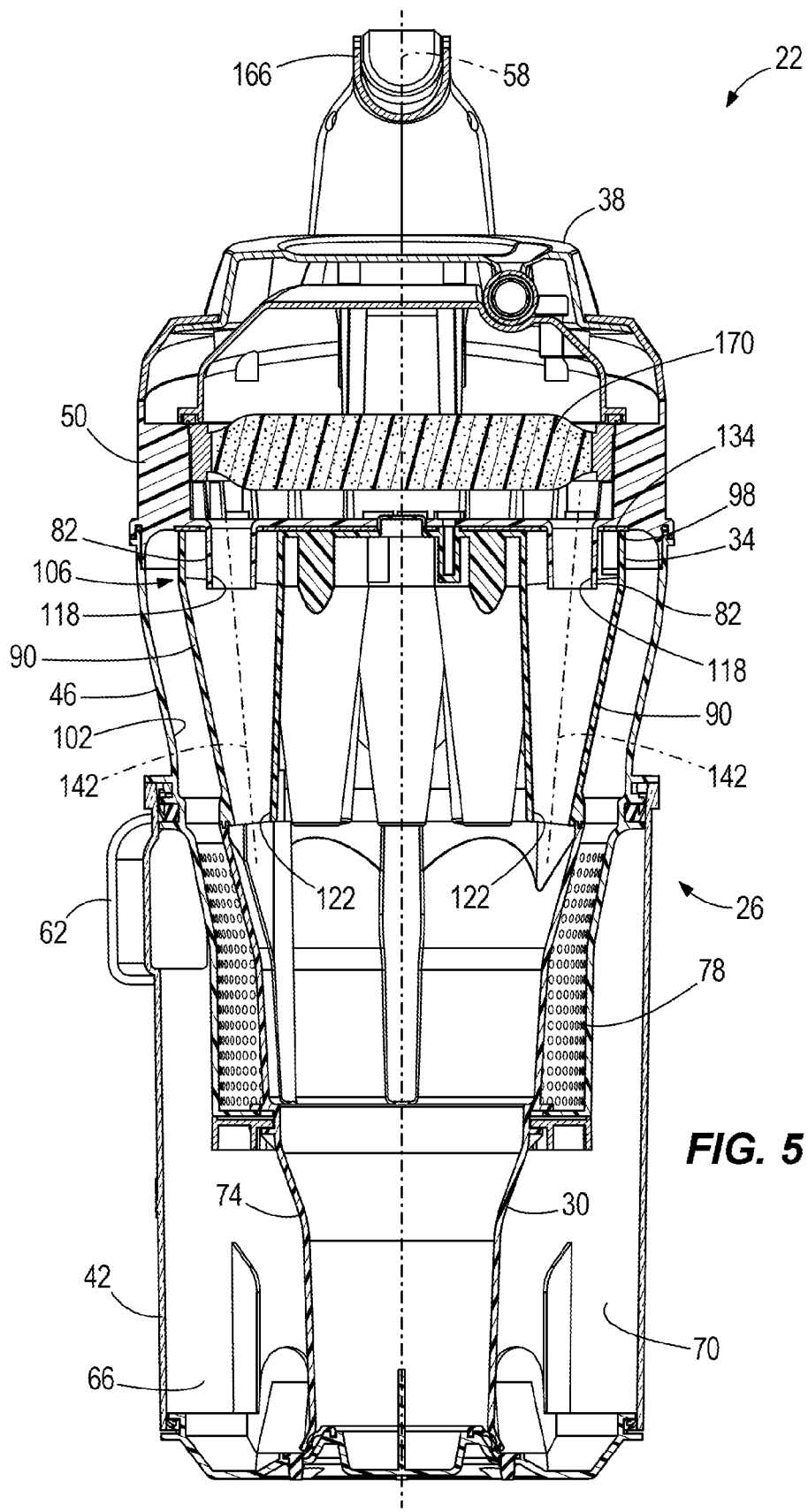
FIG. 5 is a cross-sectional view of the cyclonic separator assembly taken along section line 5-5 of FIG. 3.

In the illustrated embodiment, the body 30 is divided into a lower body portion 42, a mid body portion 46, and an upper body portion 50. When assembled together, the body portions 42, 46, 50 define an outer surface 54 (FIG. 1) of the assembly 22 and a central longitudinal axis 58 (FIGS. 4 and 5). The lower body portion 42 includes an inlet 62 that receives airflow from the nozzle in the foot 14 or the accessory tool. A primary dirt cup 66 is defined by the lower body 42 between an inner surface 70 of the lower body 42 and an outer surface 74 of the inner dirt cup 30. The primary dirt cup 66 collects particles that fall out of the airflow as the airflow travels through the primary cyclone stage. The mid body portion 46 is mounted on top of the lower body portion 42 and includes a perforated baffle 78 that extends into the lower body portion 42. The upper body portion 50 is mounted on top of the mid body portion 46 and the cyclone unit 34. The upper body portion 50 includes a plurality of inlet tubes 82 (FIG. 4) and an outlet 86. The inlet tubes 82 communicate with the cyclone unit 34 to receive the airflow from the cyclone unit 34. The outlet 86 directs the airflow out of the assembly 22.

As shown in FIGS. 4 and 5, the inner dirt cup 30 is positioned within the lower body portion 42 beneath the cyclone unit 34. The inner, or secondary, dirt cup 30 collects particles that fall out of the airflow as the airflow travels through the secondary cyclone stage. In the illustrated embodiment, the inner dirt cup 30 is centrally located within the body 26 (e.g., axially aligned with the central longitudinal axis 58). In other embodiments, the inner dirt cup 30 may be positioned elsewhere relative to the body 26.

The cyclone unit 34 is positioned within the mid body portion 46 and mounted on top of the inner dirt cup 30. The cyclone unit 34 includes a plurality of first cyclones 90 and a plurality of second cyclones 94 that are arranged in parallel to receive airflow from the primary cyclone stage. In the illustrated embodiment, the first and second cyclones 90, 94 are integrally formed (e.g., molded) as a single unit such that the cyclone unit 34 is a single, unitary body. In other embodiments, the first and second cyclones 90, 94 may be discrete components that are coupled together to form the cyclone unit 34. The cyclone unit 34 has an outer perimeter 98 that is spaced apart from an inner surface 102 of the mid body portion 46. The cyclone unit 34 and the mid body portion 46 thereby define an inlet space or gap 106 that receives airflow from the first cyclone stage (i.e., the lower body portion 42) and supplies the airflow to the second cyclone stage (i.e., the cyclone unit 34).

All of the illustrated cyclones 90, 94 are generally the same shape and size. The cyclones 90, 94 are tapered tubes that extend from an upper surface 110 of the cyclone unit 34 toward the inner dirt cup 30. Each cyclone 90, 94 includes an inlet 114, an air outlet 118, and a particle outlet 122. The inlets 114 communicate with inlet paths 126, 130 formed on the upper surface 110 of the cyclone unit 34. Each inlet path 126, 130 extends between the inlet space 106 and the inlet 114 of the corresponding cyclone 90, 94 to direct airflow from the inlet space 106 into the cyclone 90, 94. In the illustrated embodiment, each inlet path 126, 130 is associated with one cyclone 90, 94. In other embodiments, one inlet path 126, 130 may be associated with two or more cyclones 90, 94. The first inlet paths 126, which extend between the inlet space 106 and the first cyclones 90, are generally shorter than the second inlet paths 130, which extend between the inlet space 106 and the second cyclones 94. The first inlet paths 126 each have a first length $L_1$, and the second inlet paths 130 each have a second length $L_2$. The length $L_1$, $L_2$ of each inlet path 126, 130 is measured along a center of the inlet path 126, 130 from the outer perimeter 98 of cyclone unit 34 to the inlet 114 of the corresponding cyclone 90, 94. A ratio of the second length $L_2$ to the first length $L_1$ is less than 2. In the illustrated embodiment, the first length $L_1$ is about 0.7 inches and the second length $L_2$ is about 1.3 inches such that the ratio of the second length $L_2$ to the first length $L_1$ is about 1.8. These relatively short inlet path lengths $L_1$, $L_2$ help reduce the pressure drop within the secondary cyclone stage.

As shown in FIGS. 4 and 5, the air outlets 118 of the cyclones 90, 94 are defined by the inlet tubes 82 of the upper body portion 50. The illustrated inlet tubes 82 extend partially into each of the cyclones 90, 94. A cover plate 134 is positioned between the cyclone unit 34 and the upper body portion 50 to help support the upper body portion 50 on the cyclone unit 34. The cover plate 134 defines openings 138 (FIG. 2) through which the inlet tubes 82 can extend into the cyclones 90, 94.

The particle outlets 122 of the cyclones 90, 94 are located at lower ends of the cyclones 90, 94 opposite from the air outlets 118. The particle outlets 122 direct dirt, dust, and other debris into the inner dirt cup 30. Each cyclone 90, 94 defines a longitudinal axis 142, 146 extending between the air outlet 118 to the particle outlet 122. As shown in FIG. 5, the particle outlets 122 of the first cyclones 90 are positioned radially inward of the air outlets 118 such that the longitudinal axes 142 are obliquely angled relative to the central longitudinal axis 58 of the body 26. As shown in FIG. 4, the particle outlets 122 of the second cyclones 94 are aligned with the air outlets 118 such that the longitudinal axes 146 are parallel to the central longitudinal axis 58 of the body 26.

Figure 3:
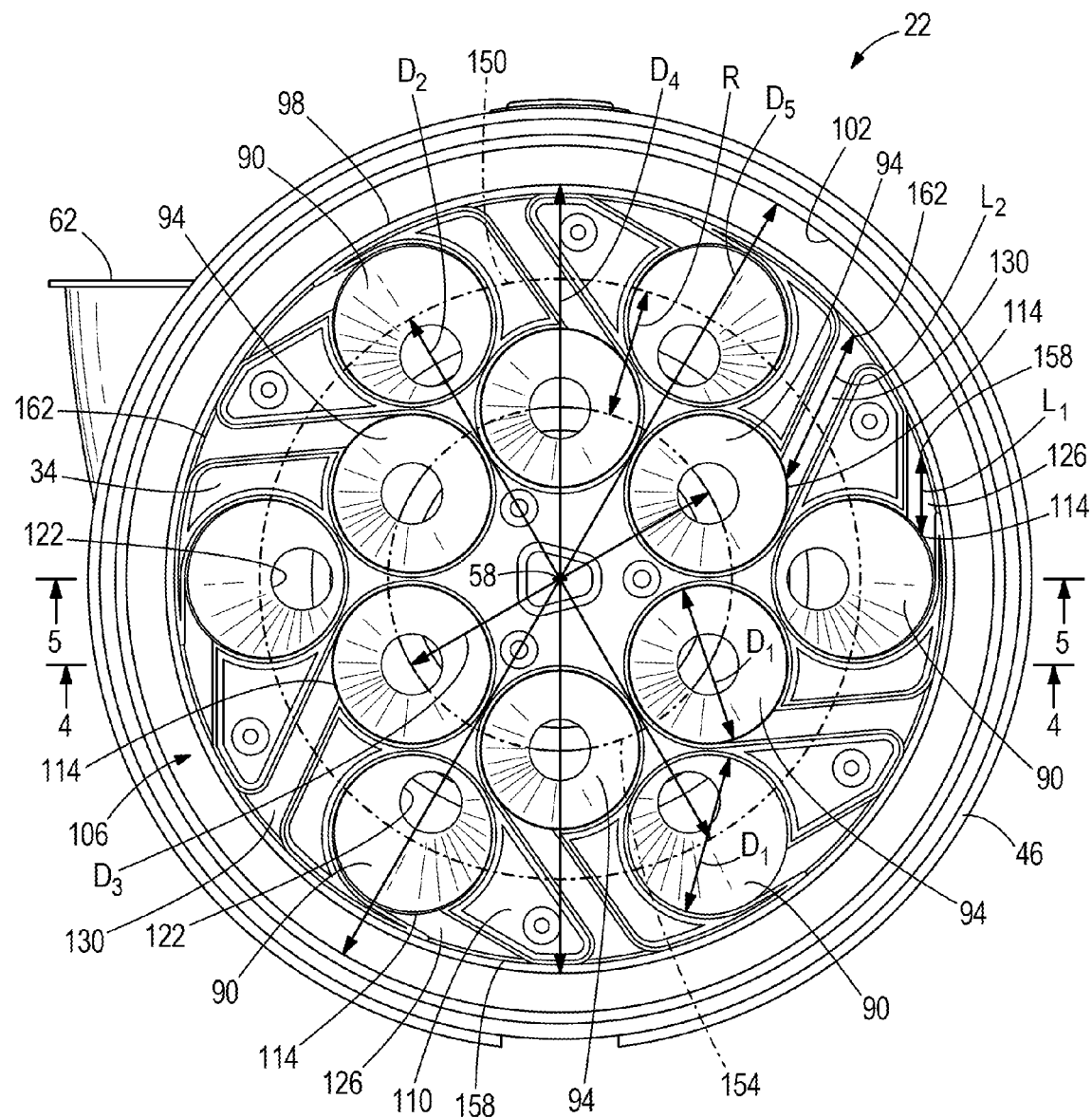
FIG. 3 is a top view of a cyclone unit positioned within the cyclonic separator assembly.

As shown in FIG. 3, each cyclone 90, 94 has a maximum outer diameter $D_1$ measured at the upper surface 110 of the cyclone unit 34. In some embodiments, the maximum outer diameter $D_1$ of each cyclone 90, 94 is between about 1.0 inch and about 1.5 inches. In the illustrated embodiment, the maximum outer diameter $D_1$ is about 1.2 inches. Each cyclone 90, 94 thereby has a cross-sectional area, measured perpendicular to the corresponding longitudinal axis 142, 146 of the individual cyclone 90, 94, between about 0.8 square-inches and about 1.8 square-inches. In the illustrated embodiment, the cross-sectional area of each cyclone 90, 94 is about 1.1 square-inches. In other embodiments, the first cyclones 90 may have different maximum diameters and cross-sectional areas compared to the second cyclones 94.

In some embodiments, the upper surface 110 of the cyclone unit 34 may be non-planar. For example, the upper surface 110 may be spherical, convex, or otherwise rounded such that at least some of the cyclones 90, 94 are tilted or obliquely angled relative to the central longitudinal axis 58 of the body 26. In such embodiments, the maximum diameters $D_1$ and cross-sectional areas of the cyclones 90, 94 may be measured through different planes relative to each other.

The illustrated cyclones 90, 94 are arranged along two circles 150, 154. The first cyclones 90 are arranged along the outer circle 150 adjacent the outer perimeter 98 of the cyclone unit 34. The second cyclones 94 are arranged along the inner circle 154 adjacent a central portion of the cyclone unit 34. As used herein, a "circle" refers to an imaginary circle that extends through the centers of the corresponding cyclones 90, 94, similar to a bolt circle. Each circle 150, 154 has its center or origin defined by the central longitudinal axis 58 of the body 26. The circles 150, 154 have different diameters such that the first cyclones 90 are spaced radially further from the central longitudinal axis 58 than the second cyclones 94. For example, in the illustrated embodiment, the first, or outer, circle 150 has a diameter $D_2$ of about 4.4 inches, while the second, or inner, circle 154 has a diameter $D_3$ of about 2.6 inches. In other embodiments, the diameters $D_2$, $D_3$ of the circles 150, 154 may be relatively larger or smaller.

In the illustrated embodiment, each second cyclone 94 is nested between two adjacent first cyclones 90. That is, a portion of each second cyclone 94 is positioned radially further from the central longitudinal axis 58 of the body 26 than portions of the two adjacent first cyclones 90 such that a radially-outermost point of the second cyclone 94 is closer to the outer perimeter 98 of the cyclone unit 34 than radially-innermost points of the two adjacent first cyclones 90. With such an arrangement, a radial distance R between the outer circle 150 and the inner circle 154 (e.g., about 0.9 inches) is less than the maximum diameters $D_1$ of the cyclones (e.g., about 1.2 inches).

In addition, the number of first cyclones 90 is substantially equal to the number of second cyclones 94. "Substantially equal" means the number of first cyclones 90 is within one of the number of second cyclones 94. For example, in the illustrated embodiment, the plurality of first cyclones 90 includes six cyclones, and the plurality of second cyclones 94 includes six cyclones. In other embodiments, the plurality of first cyclones 90 may include one more or one fewer cyclone than the plurality of second cyclones 94, yet the number of cyclones in each plurality may still be substantially equal. Because each cyclone 90, 94 is associated with one inlet path 126, 130, the number of first inlet paths 126 is also substantially equal to the number of second inlet paths 130. As such, the number of first cyclones 90, the number of first inlet paths 126, the number of second cyclones 94, and the number of second inlet paths 130 are all substantially equal. In other embodiments, the number of first cyclones 90 and/or inlet paths 126 may not be substantially equal to the number of second cyclones 94 and/or inlet paths 130.

Furthermore, the first and second cyclones 90, 94 alternate around the central longitudinal axis 58 of the body 26.

Similarly, the first inlet paths 126 and the second inlet paths 130 alternate around the central longitudinal axis 58. Each second inlet path 130 thereby extends from the inlet space 106 to one of the second cyclones 94 between two adjacent first cyclones 90. In addition, each inlet path 126, 130 has an end 158, 162 at the outer perimeter 98 of the cyclone unit 34 in communication with the inlet space 106. The ends 158 of the first inlet paths 126 are circumferentially spaced evenly about the outer perimeter 98. The ends 162 of the second inlet paths 130 are also circumferentially spaced evenly about the outer perimeter 98. The ends 158, 162 of the first and second inlet paths 126, 130 alternate around the outer perimeter 98 such that airflow circling around the inlet space 106 passes a first inlet path end 158, then a second inlet path end 162, then a first inlet path end 158, and so on. Such an arrangement makes the cyclone unit 34 generally symmetrical about the central longitudinal axis 58.

The outer perimeter 98 of the cyclone unit 34 defines a total diameter $D_4$ and a total cross-sectional area of the cyclone unit 34. The total cross-sectional area is measured perpendicular to the central longitudinal axis 58 of the body 26 at the upper surface 110 of the cyclone unit 34. This is also the cross-section of the cyclone unit 34 at which the diameters of the cyclones 90, 94 are equal to the maximum diameter $D_1$. The total cross-sectional area represents a footprint area of the cyclone unit 34, which ignores the fact that some material is removed from the cyclone unit 34 to form the cyclones 90, 94. In some embodiments, the total diameter $D_4$ of the cyclone unit 34 is between about 5.5 inches and about 6.0 inches, and the total cross-sectional area of the cyclone unit 34 is between about 23 square-inches and about 29 square-inches. In the illustrated embodiment, the total diameter $D_4$ is about 5.8 inches, and the total cross-sectional area is about 26.5 square-inches.

As noted above, each of the illustrated cyclones 90, 94 has a cross-sectional area, measured perpendicular to the central longitudinal axis 58, of about 1.1 square-inches. Since there are twelve cyclones 90, 94 in the illustrated embodiment, a sum of the cross-sectional areas of the first and second cyclones 90, 94 is about 13.2 square-inches. As such, a ratio of the sum of the cross-sectional areas of the cyclones 90, 94 to the total cross-sectional area of the cyclone unit 34 is about 0.5. In other embodiments, the ratio may be between about 0.4 and about 0.6. The first and second cyclones 90, 94 are thereby designed and arranged to utilize a relatively large amount of the cross-sectional area of the cyclone unit 34. The amount of unused or 'dead' space within the cyclone unit 34 is thereby reduced.

The inner surface 102 of the mid body portion 46 defines a diameter $D_5$ that is greater than the total diameter $D_4$ of the cyclone unit 34 to define the inlet space 106. In some embodiments, the diameter $D_5$ of the mid body portion 46 is between about 6.5 inches and about 7.0 inches. In the illustrated embodiment, the diameter $D_5$ is about 6.8 inches. As such, a cross-sectional area of the inlet space 106, measured perpendicular to the central longitudinal axis 58, is between about 4 square-inches and about 15 square-inches. In the illustrated embodiment, the cross-sectional area of the inlet space 106 is about 9.8 square inches. In some embodiments, a ratio of the sum of the cross-sectional areas of the cyclones 90, 94 to the cross-sectional area of the inlet space 106 is between about 1.3 and about 1.5. Additionally or alternatively, a ratio of the total cross-sectional area $D_4$ of the cyclone body 34 to the cross-sectional area of the inlet space 106 is between about 2 and about 3.

As shown in FIGS. 2 and 4-5, the cover 38 is positioned on top of the upper body portion 50. In the illustrated embodiment, the cover 38 includes a handle 166 to facilitate lifting and carrying the cyclonic separator assembly 22 apart from the vacuum 10. In some embodiments, the handle 166 may also be used to lift the vacuum 10 while the cyclonic separator assembly 22 is connected to the vacuum 10. A filter 170 is captured between the cover 38 and the upper body portion 50. The filter 170 filters fine particles out of the airflow exiting the cyclone unit 34 before the airflow is discharged from the separator assembly 22.

In operation, airflow enters the cyclonic separator assembly 22 through the inlet 62 in the lower body portion 42. The airflow circles through the lower body portion 42 to separate relatively large debris from the airflow. The debris falls into the primary dirt cup 66 defined by the lower body portion 42. The partially-cleaned airflow then travels through the perforated baffle 78 of the mid body portion 46 and into the inlet space 106 between the mid body portion 46 and the cyclone unit 34. Next, the airflow enters the inlet paths 126, 130 in the cyclone unit 34 to flow into the first and second cyclones 90, 94. The airflow circles within the first and second cyclones 90, 94 to separate relatively small debris from the airflow. The debris falls out of the cyclones 90, 94 and into the inner dirt cup 30. Then, the airflow travels out of the cyclones 90, 94 through the inlet tubes 82 in the upper body portion 50 and toward the filter 170. As the airflow flows through the filter 170, the filter 170 removes fine debris from the airflow. After passing through the filter 170, the relatively clean airflow is discharged from the cyclonic separator assembly 22 through the outlet 86 in the upper body portion 50. Upon leaving the cyclonic separator assembly 22, the air is passed down to a suction motor (not shown) in the bottom of the handle 18, and then the air is exhausted from the suction motor into the atmosphere.

Various features and advantages of the invention are set forth in the following claims.

The invention claimed is:

1. A cyclonic separator assembly for use with a vacuum cleaner, the cyclonic separator assembly comprising:
    a body having an inlet, an outlet, and an inner surface; and
    a cyclone unit positioned within the body between the inlet and the outlet, the cyclone unit having an outer perimeter that is spaced apart from the inner surface of the body to define an inlet space therebetween, the cyclone unit including
        a plurality of first cyclones arranged along an outer circle adjacent the outer perimeter,
        a plurality of first inlet paths extending from the inlet space to the plurality of first cyclones, each first inlet path having an end at the outer perimeter of the cyclone unit, the ends of the plurality of first inlet paths being circumferentially spaced evenly about the outer perimeter,
        a plurality of second cyclones arranged along an inner circle that is spaced apart from the outer circle, and
        a plurality of second inlet paths extending from the inlet space to the plurality of second cyclones, each second inlet path having an end at the outer perimeter of the cyclone unit, the ends of the plurality of second inlet paths being circumferentially spaced evenly about the outer perimeter.

2. The cyclonic separator assembly of claim 1, wherein the ends of the plurality of first inlet paths and the ends of the plurality of second inlet paths alternate around the outer perimeter of the cyclone unit.

3. The cyclonic separator assembly of claim 2, wherein the body defines a central longitudinal axis, and wherein the plurality of first cyclones and the plurality of second cyclones alternate around the central longitudinal axis.

4. The cyclonic separator assembly of claim 3, wherein each second inlet path extends from the inlet space to one of the plurality of second cyclones between two adjacent primary cyclones.

5. The cyclonic separator assembly of claim 4, wherein each second cyclone is nested between two adjacent first cyclones.

6. The cyclonic separator assembly of claim 1, wherein the number of cyclones in the plurality of first cyclones, the number of inlet paths in the plurality of first inlet paths, the number of cyclones in the plurality of second cyclones, and the number of inlet paths in the plurality of second inlet paths are all substantially equal.

7. The cyclonic separator assembly of claim 1, wherein each first cyclone has a first maximum diameter and each second cyclone has a second maximum diameter, and wherein the first maximum diameter is generally equal to the second maximum diameter.

* * * * *